(12) United States Patent  
Umapathy et al.

(10) Patent No.: US 9,330,278 B1
(45) Date of Patent: *May 3, 2016

(54) SERVICE PROFILES FOR ASSOCIATING DATA SERVICES WITH APPLICATIONS

(71) Applicant: GOOGLE INC., Mountain View, CA (US)

(72) Inventors: Vijay Umapathy, Sunnyvale, CA (US); Michael Bachman, Sunnyvale, CA (US); Alejo Grigera, San Francisco, CA (US); Vitor Rodrigues, San Jose, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/494,395

(22) Filed: Sep. 23, 2014

Related U.S. Application Data

(63) Continuation-in-part of application No. 13/654,823, filed on Oct. 18, 2012, now Pat. No. 8,875,062.

(51) Int. Cl.
| | |
|---|---|
| *G06F 13/00* | (2006.01) |
| *G06F 15/00* | (2006.01) |
| *G06F 21/62* | (2013.01) |
| *G06F 3/0481* | (2013.01) |
| *G06F 3/0482* | (2013.01) |

(52) U.S. Cl.
CPC .......... *G06F 21/6245* (2013.01); *G06F 3/0482* (2013.01); *G06F 3/04817* (2013.01)

(58) Field of Classification Search
CPC .............................. G06Q 30/02; G06F 13/00

USPC ................ 715/761–765, 736–738, 851–853, 715/840–843

See application file for complete search history.

(56) References Cited

U.S. PATENT DOCUMENTS

| | | | |
|---|---|---|---|
| 6,212,561 B1 * | 4/2001 | Sitaraman et al. ............ | 709/225 |
| 2004/0117322 A1 * | 6/2004 | Bjorksten et al. ............... | 705/80 |
| 2013/0097233 A1 * | 4/2013 | Raman et al. ................. | 709/204 |
| 2013/0229944 A1 | 9/2013 | Montemurro et al. | |

* cited by examiner

*Primary Examiner* — Kevin Nguyen
(74) *Attorney, Agent, or Firm* — Procopio, Cory, Hargreaves & Savitch LLP

(57) ABSTRACT

Service profiles for associating data services with applications are described, including receiving a first input from a user identifying a first service to include in a service profile; receiving a second input from the user identifying a second service to include in the service profile, the second service is associated with the user; receiving a third input from the user defining one or more boundaries of one or more of the first service and the second service; receiving a fourth input from the user indicating association of the service profile with one of the at least one application; storing the service profile with information of the first service, the second service, and the association with the one of the at least one application; and based on the service profile, determining whether to grant access to the first service and second service by the at least one application.

18 Claims, 7 Drawing Sheets

SERVICE PROFILES FOR ASSOCIATING DATA SERVICES WITH APPLICATIONS

CROSS-REFERENCE TO RELATED APPLICATION

This continuation application claims the benefit of U.S. application Ser. No. 13/654,823, filed Oct. 18, 2012, the disclosure of which is hereby incorporated by reference in its entirety.

BACKGROUND

Users may have accounts associated with different parties. For example, a user may have a social network account, an online shopping account, and an e-mail account, with each account being associated with a different party. The user may benefit from sharing the user's data from one account with another account. For example, sharing the user's online shopping data with the user's social network may lead to the user being offered shopping promotions or coupons based on the user's shopping data.

However, once a user shares data from his or her account with a third-party account (e.g., a third-party application), the user (a second party) may not know what information from the first-party account is being accessed and used by the third-party account. The user may not know how or when the third-party account accesses or uses the user's data from the first-party account.

SUMMARY

The subject matter discussed herein relates generally to data processing and, more particularly, to creating and managing service profiles.

Creating and managing service profiles for associating data services with applications are described. The subject matter includes at least a computing device, a computer product, and a method for including receiving a first input from a user identifying a first service to include in a service profile, the first service is associated with the user; receiving a second input from the user identifying a second service to include in the service profile, the second service is associated with the user; receiving a third input from the user defining one or more boundaries of one or more of the first service and the second service, wherein the service profile is to be associated with at least one application to allow the at least one application to access the first service and second service; receiving a fourth input from the user indicating association of the service profile with one of the at least one application; and storing the service profile with information of the first service, the second service, and the association with the one of the at least one application, wherein the service profile is used to determine whether to grand access to the first service and second service by the at least one application.

Implementations may include one or more of the following features. For example, the service profile and another service profile may be provided for displaying as icons, and one of the icons representing the service profile includes a visual representation of the number of the at least one application.

In some implementations, the at least one application, when associated with one service, may not associate with another service profile.

In some implementations, the at least one application, one or more services, when included in a service profile, may not be included in another service profile.

In some implementations, the user may modify one or more services included in a service profile, modify one or more boundaries of one or more services, and/or modify one or more applications associated with a service profile.

In some implementations, associating a service profile with an application may be performed by a user dragging an icon representing the service profile to another icon representing the application or dragging an icon representing the application to another icon representing the service profile.

The subject matter discussed herein provides one or more advantages. One advantage may be providing the user with transparency with respect to access of user data, as well as an ability for the user to control and enforce access of user data.

The details of one or more example implementations are set forth in the accompanying drawings and the description below. Other features, aspects, and advantages will become apparent from the description, the drawings, and the claims.

DETAILED DESCRIPTION

Figure 1:
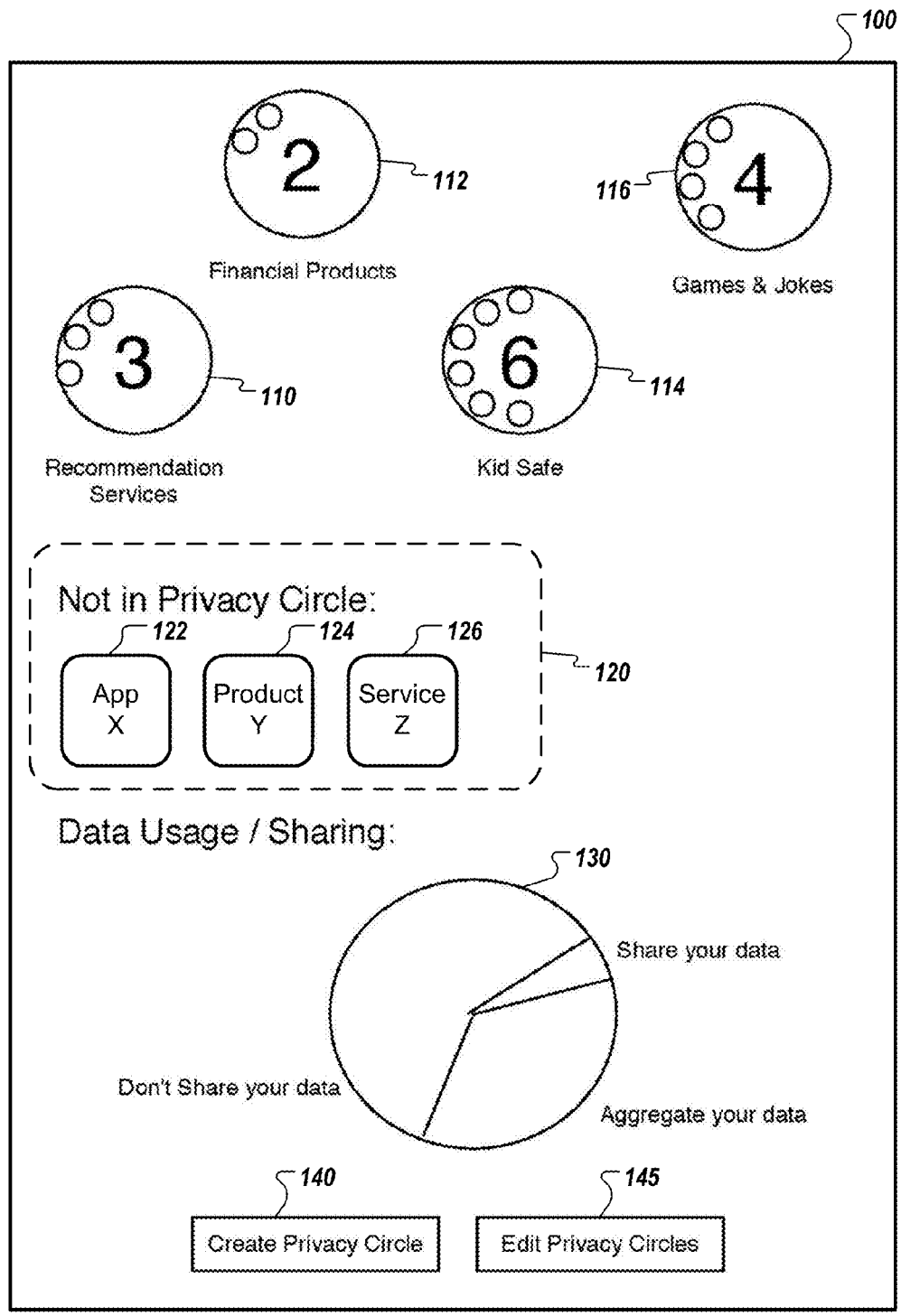
FIG. 1 shows an example user interface for managing service profiles.

The subject matter described herein is taught by way of example implementations. Various details have been omitted for the sake of clarity and to avoid obscuring the subject matter. Examples shown below are directed to structures and functions for creating and managing service profiles for associating data services with applications.

Described herein are example implementations of systems, devices, and methods that provide mechanisms (e.g., user interfaces) for creating and managing service profiles. The service profiles allow users to control access to users' data and services by other applications (e.g., third-party applications). The service profiles provide users the transparency of what applications are given access to what users' data.

Data associated with users can be classified into categories (e.g., email data, video data, social network data, etc.). Users may use the provided mechanisms to define one or more service profiles, and the user may select one or more categories of data (which may be referred to as data, data stream, service data, service, or the like) to include in each of the service profiles. The user may decide which applications to associate with each of the service profiles. Once an application is associated with a service profile, the application may access the categories of data included in the service profile and may not access any category of data not included in the service profile.

For example, a user may define a service profile "Recommendation Services," to which the user may identify and add categories of data, such as data from location data service, social network data, and data from authenticated search (e.g., to personalize the user experience and search results). The user may control access by applications (e.g., third-party applications) to data associated with the user. For example, the user may create and/or modify a service profile to, for example, turn on and off a category of data; add, modify, or delete one or more applications (e.g., third-party applications) associated with the service profile; and/or perform other configurations of the service profile.

When an application (e.g., third-party application) requests access to data associated with a user, the access request may be checked against a service profile, with which the application is associated, to determine whether the application has access to the user data. For example, if the application requests access to the user's e-mail data, and the service profile defines that access to the user's e-mail data is allowed by the application, the application is granted access to the user's e-mail data. If, however, the service profile does not define that the user's e-mail data are a category of data the application is allowed to access, the application is denied access to the user's e-mail data.

As used herein, the term "product" or "service" or "application" refers to any information, data, communication, infrastructure, organization, service, assistance, entertainment, or the like provided by one or more providers via online communication to at least one user. Examples of products, services, or applications may include, but are not limited to, online searching, e-commerce services, maps, locational data, dating services, online forums, online platforms, bulletin boards, social networks, websites, chat rooms, email communication, image sharing sites, video sharing sites, audio sharing sites, data sharing platforms, data storage, software, tax preparation and filing, gaming, mobile applications, news, translation, toolbars, calendars, instant messaging, short message service, voice, phone, video communication service, and the like. Products, services, or applications may be provided on any platform or device ranging from a mobile device (e.g., smartphone), to a semi-mobile device (e.g., a laptop), and to a non-mobile device (e.g., a kiosk, television, computer, etc.). A product, service, or application may communicate to a provider or another product, service, or application using a wired or wireless connection.

As used herein, the term "website" or "web site" or "site" refers to a set of web pages for providing or supporting related services. A website can be hosted on at least one computing device (e.g., a system, server, web server, application server, client, or any label) accessible via a network or connection (wired and/or wireless). A website can be accessed and/or supported using at least one top-level Uniform Resource Locator (URL, e.g., "abc.gov," "123.org," "zxc.com," "bestads.com," "virtualbank.com," and the like). A website can be operated and/or supported by one or more business entities. For example, ZXC Corporation may operate the website "zxc.com" that includes web pages, content, and/or services from "zxc.bestads.com" (e.g., advertisement services provided by another firm) and "virtualbank.com/zxc-payment-services" (e.g., financial services provided by a financial institution).

As used herein, the term "online account" or "account" refers to a product, service, or application associated with a user. A user may have, subscribe to, and/or use one or more accounts or online accounts (e.g., a user may have an email account, a social network account, a photo sharing account, a video sharing account, an online storage account, a mobile account, a blog account, etc.). Each of the email service, social network, photo sharing service, video sharing service, online storage, mobile service, etc. can be referred to as a product, service, or application.

An account can be an internet or external account (e.g., an end user subscribing to an openly, publicly, or semi-publicly available service), an intranet or internal account (e.g., an employee subscribing to a service of a company or firm), an extranet or controlled availability account (e.g., an account available to vendors, customers, or other controlled subscribers), or another type of account.

As used herein, the term "category" or "type" with respect to data associated with a service profile refers to the grouping of data and services by a user. A category of data may come from a service (e.g., email service), a part of a service (e.g., only emails to and from some users or email addresses), or a combination of two or more services (e.g., the combination of at least a part of one service, such as email services, with at least a part of another service, such as calendar service or contracts management service). For example, in one service profile, a user may define or group incoming emails as "email data" (excluding outgoing emails). In another service profile, a user may define outgoing emails as "email data" (excluding incoming emails). In yet another service profile, a user may define all emails (e.g., incoming and outgoing emails) as "email data." In any of these example groupings of "email data," or in any other example, a user may include some or all of the user's address book contacts as part of "email data." To further illustrate, a user may define a "media" category of data in different service profiles to include different combinations of one or more of audio data, video data, photo data, the metadata thereof, and literal data.

FIG. 1 shows an example user interface for creating and managing service profiles. In this example, service profiles may be created with consideration for a user's privacy, and the service profiles may be called privacy circles. User interface (UI) 100 is shown with four privacy circles 110-116 (e.g., service profiles). Each privacy circle may have a label. For example, a privacy circle 110 is shown with a label "Recommendation Services." In some implementations, a privacy circle may have other visual indicators. For example, privacy circle 110 is shown with three small circles and a number "3" to indicate that three third-party applications have been associated with this privacy circle. In some implementations, the small circles may not be shown with the number and vice versa, or other visual indicators may be used. A third-party application can be referred to as a third-party service or a third-party product.

User interface 100 may show, in area 120, applications 122-126 that are not in any of the privacy circles 110-116 (e.g., these applications 122-126 have not been associated with any of the privacy circles 110-116). UI 100 may show other information 130. A button 140 may be used to create a privacy circle (e.g., privacy circles 110-116 may be created initially by pressing this button). A button 145 may be pressed to initiate editing any of the privacy circles 110-116.

To create a privacy circle, for example, a user may press button 140, which may lead the user to another UI for defining the privacy circle. The UI may be UI 200, FIG. 2, or another UI for the user to define services and data in the privacy circle and to define the categories or boundaries of the services and data. At the initial stage, a service profile may be "blank" with respect to services, applications, and/or boundaries. In some implementations, a service profile may include default or initial set of services, applications, and/or boundaries.

To edit a privacy circle, for example, the "Recommendation Services" privacy circle 110, that privacy circle may be clicked on to show that it has been selected. Then button 145 may be clicked on to start editing the selected privacy circle 110 in UI 200, FIG. 2.

After defining a service profile or privacy circle (described in FIG. 2 below), a user can associate an application with the service profile by, for example, dragging a visual symbol that represents the application (e.g., App X 122 shown in area 120) over another visual symbol that represents the service profile (e.g., privacy circle 112). In some implementations, the dragging may be performed in the reverse direction (e.g., drag privacy circle 112 over App X 122).

Figure 2:
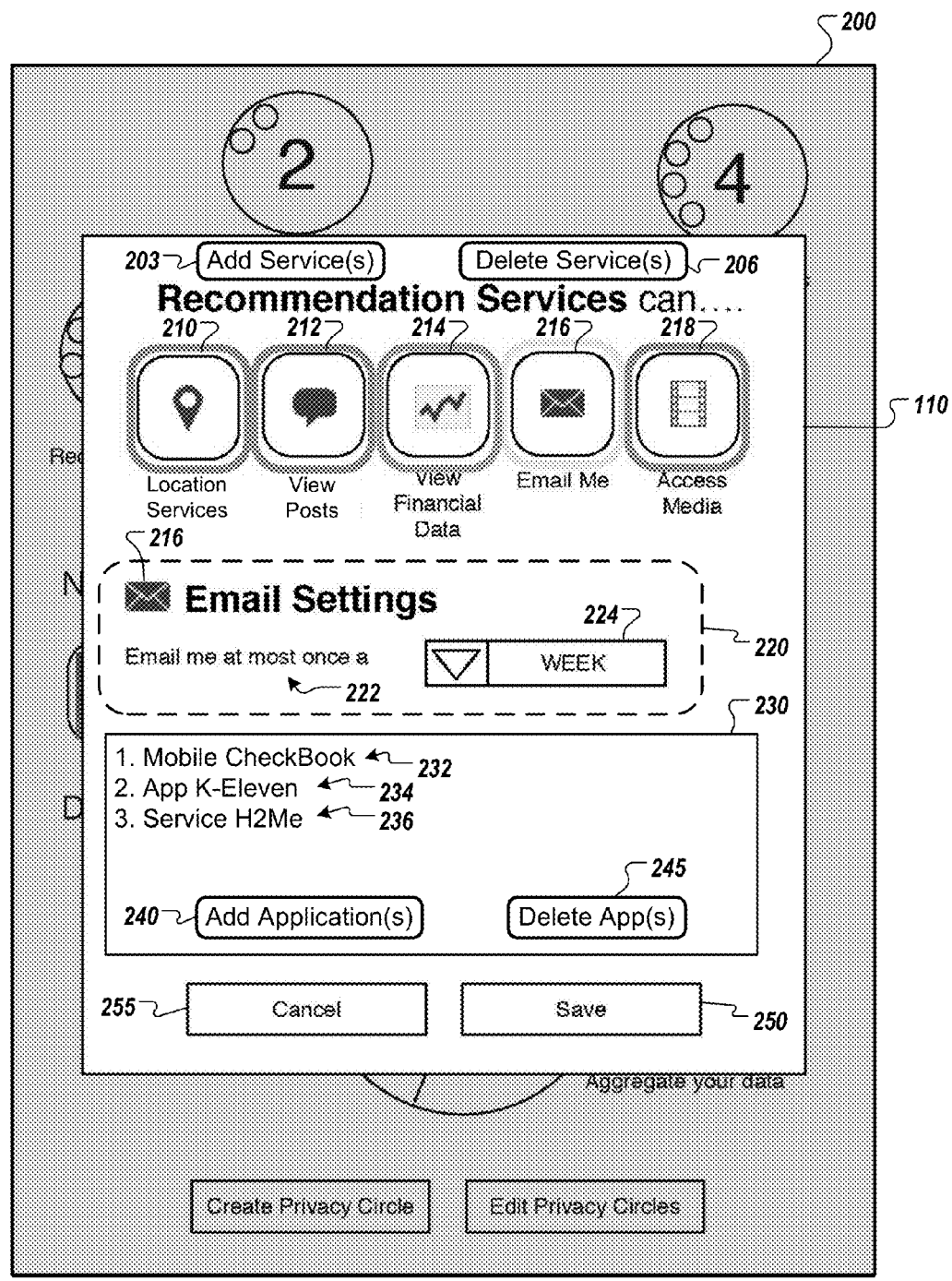
FIG. 2 shows example features of the user interface of FIG. 1.

FIG. 2 shows example features of the user interface of FIG. 1. User interface 200 allows users to create, edit, or otherwise define a service profile (or privacy circle in this example). As an example, UI 200 is shown being used to edit the "Recommendation Services" privacy circle 110.

Any number of services and/or data streams may be included in a privacy circle. For example, a user may click on the "Add Service(s)" button 203 to identify or select one or more services and/or data streams for inclusion in the "Recommendation Services" privacy circle (e.g., services and/or data streams 210-218 may be included by pressing this button). For illustration, if the user wants to add another service (e.g., "Calendar Services," not shown), the user may press on button 203, one or more services available to be included may be provided for the user to select, the user then selects one or more of the available services, the press on a "Done" button (not shown). The "Delete Service(s)" button 206 may be used to delete one or more services already included in the profile.

The user can use UI 200 to define (e.g., based on privacy settings) boundaries of each of the one or more services and/or data streams 210-218. For example, the user can click on data stream 216 labeled as "Email Me" to define its boundaries in the "Recommendation Services" privacy circle 110. Defining boundaries of a data steam or service defines the category of data or service. Category definition is shown in area 220, which includes, in this example, email frequency label 222 and email frequency selection 224.

In some implementations, UI 200 may include other controls or widgets (not shown) based on the selected data stream or service. For example, in data stream 216, which is related to the email data, one or more widgets may be included to allow the user to select the type of email messages (e.g., incoming and/or outgoing email messages) to be included as data stream "Email Me" 216.

The user may define the category of each of the services and/or data streams 210-214 and 218 as described in data stream 216 above. For example, the user may define the boundaries of a social network data stream "View Posts" 212 to limit to reading and commenting but not posting on behalf of the user; define the boundaries of the location data services 210 labeled "Location Services" to only share location data during work days between 9:00 AM and 6:00 PM local time; define the boundaries of data stream 214 labeled "View Financial Data" to allow viewing of the user's financial data but not viewing transaction data; and define the boundaries of data stream "Access Media" 218 to allow access of photo data but not video and audio data.

In some implementations, UI 200 may include an area 230 that shows which third-party applications 232-236 have been associated with the "Recommendation Services" privacy circle 210. By associating a third-party application 232, 234, or 236 with a privacy circle, a user grants that third-party application access to the services and/or data streams 210-218 included in the privacy circle. The access to the services and/or data streams 210-218 is limited by the boundaries or category defined in the privacy circle.

In some implementations, an application or a third-party application may be associated with a service profile using "Add Application(s)" button 240. For example, a user may associate an unassociated application (e.g., one shown in area 120, FIG. 1) with privacy circle 110 by pressing button 240. After which, a selection window may appear listing "App X" 122, "Product Y" 124, and "Service Z" 126 for the user to select from. The user may select one or more applications from the list (e.g., "Product Y" 124) to associate with privacy circle 110. The result may be shown as in area 330 of FIG. 3C.

The association of any third-party applications 232-236 may be removed by, for example, selecting that third-party application and clicking on the "Delete App(s)" button 245.

For simplification and clarity, the FIG. 2 example is illustrated with third-party applications 232-236. However, the example implementations described herein, including FIG. 2, are not limited to third-party applications. Applications, services, and/or products of any party (e.g., those of first party and/or second party) may be included. In some implementations, applications provided by third parties and non-third parties may be associated with a service profile. In some implementations, a service profile may be created for associating exclusively with third-party applications.

Figure 3A:
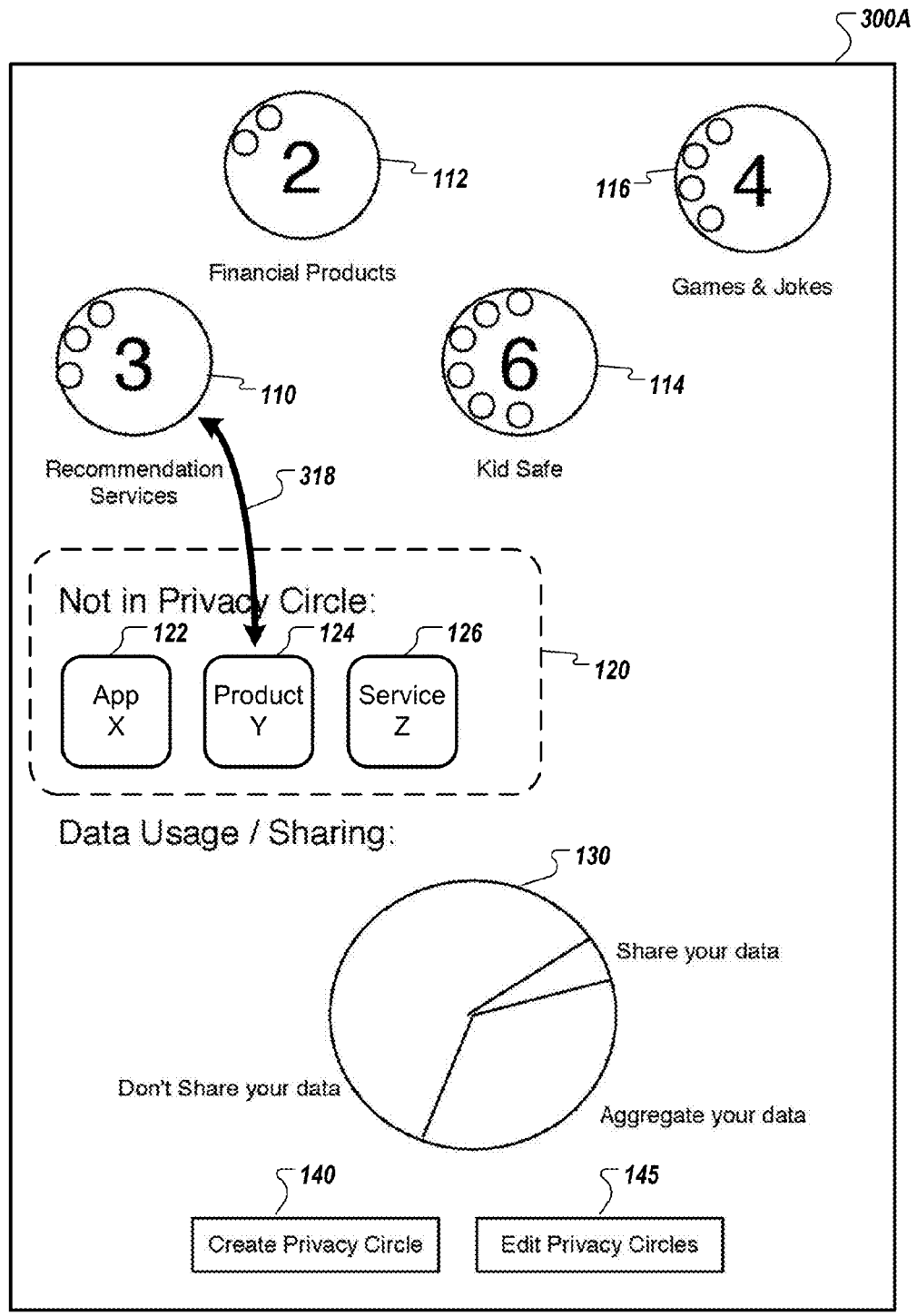
FIGS. 3A-C show example interactions using the user interfaces of FIGS. 1 and 2.

FIG. 3A shows that a service profile (e.g., privacy circle 110) may be associated with an application (e.g., "Product Y" 124) visually. The two-way arrow 318 in UI 300A illustrates that a user may select privacy circle 110 (e.g., click on it) and drag it over "Product Y" 124 and release the privacy circle 110 when it is within the hot zone of "Product Y" 124 (e.g., when the icon that represents the privacy circle 110 almost touches or covers at least a portion of the icon that represents "Product Y" 124).

In some implementations where dragging in the reverse direction is implemented, the user may select "Product Y" 124 (e.g., click on it) and drag it over the privacy circle 110 and release "Product Y" 124 when it is within the hot zone of the privacy circle 110 (e.g., when the icon that represents "Product Y" 124 almost touches or covers at least a portion of the icon that represents the privacy circle 110).

Service profile can be visually represented using any symbols or visual indicators that may look two-dimensional and/or three dimensional. For discussion purposes only, circles (e.g., privacy circles) are shown. In implementations, visual indicators such as shape, size, and/or color (e.g., squares, rectangles, triangles, polygons of any shape, etc.) may be used. In some implementations, a service profile may be represented using text (e.g., "Recommendation Services").

Figure 3B:
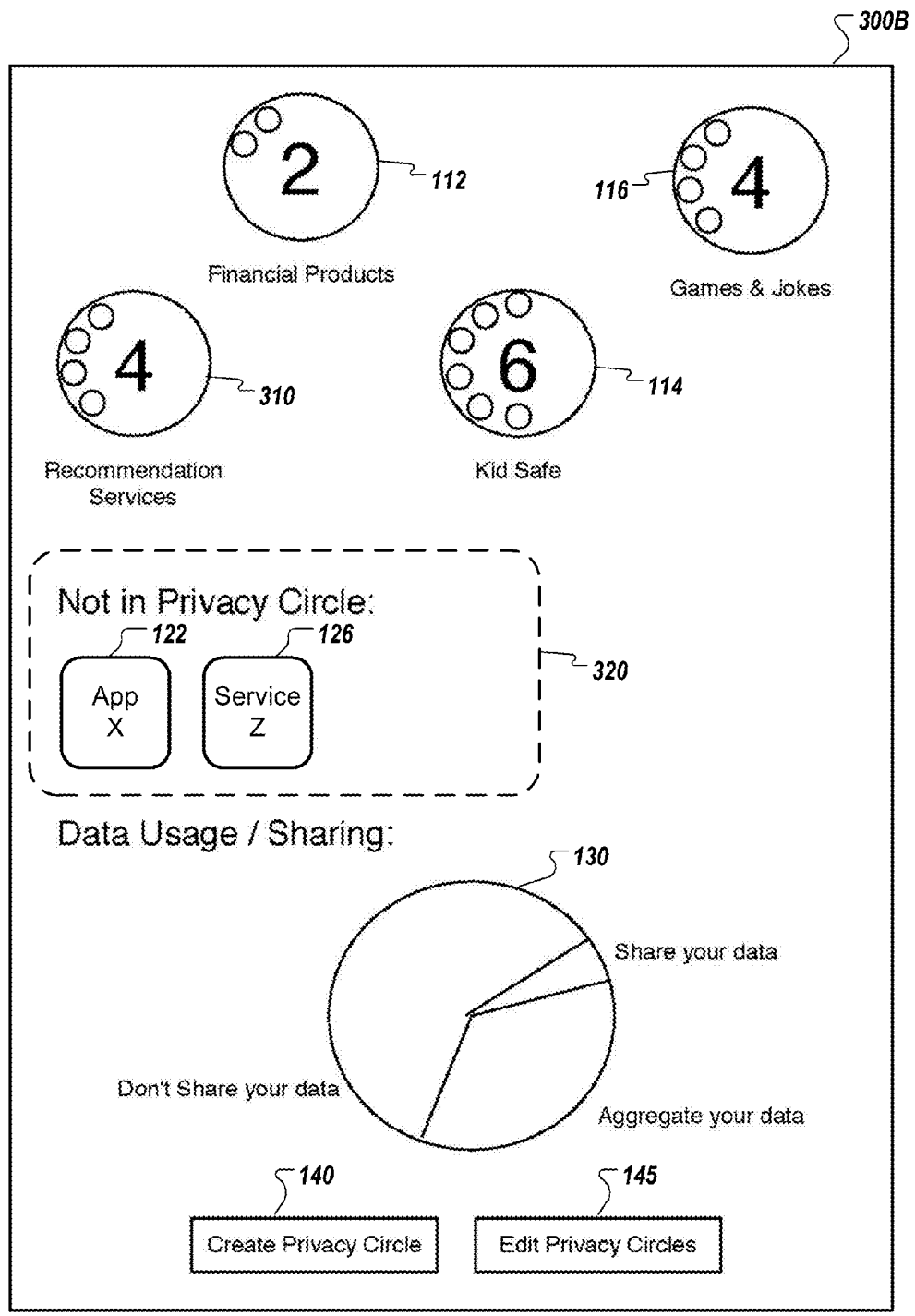

FIG. 3B shows example changes to the UI in FIG. 1 after the association of "Product Y" 124 with privacy circle 110 as described above (e.g., in FIG. 3A). In UI 300B, the "Recommendation Services" privacy circle 310 has changed from showing three small circles and a number "3" to showing four circles with a number "4" to indicate that another third-party application (e.g., "Product Y" 124) has been associated with privacy circle 310.

With "Product Y" 124 no longer being "Not in Privacy Circle," area 320 shows third-party applications 122 and 126 and not "Product Y" 124.

Figure 3C:
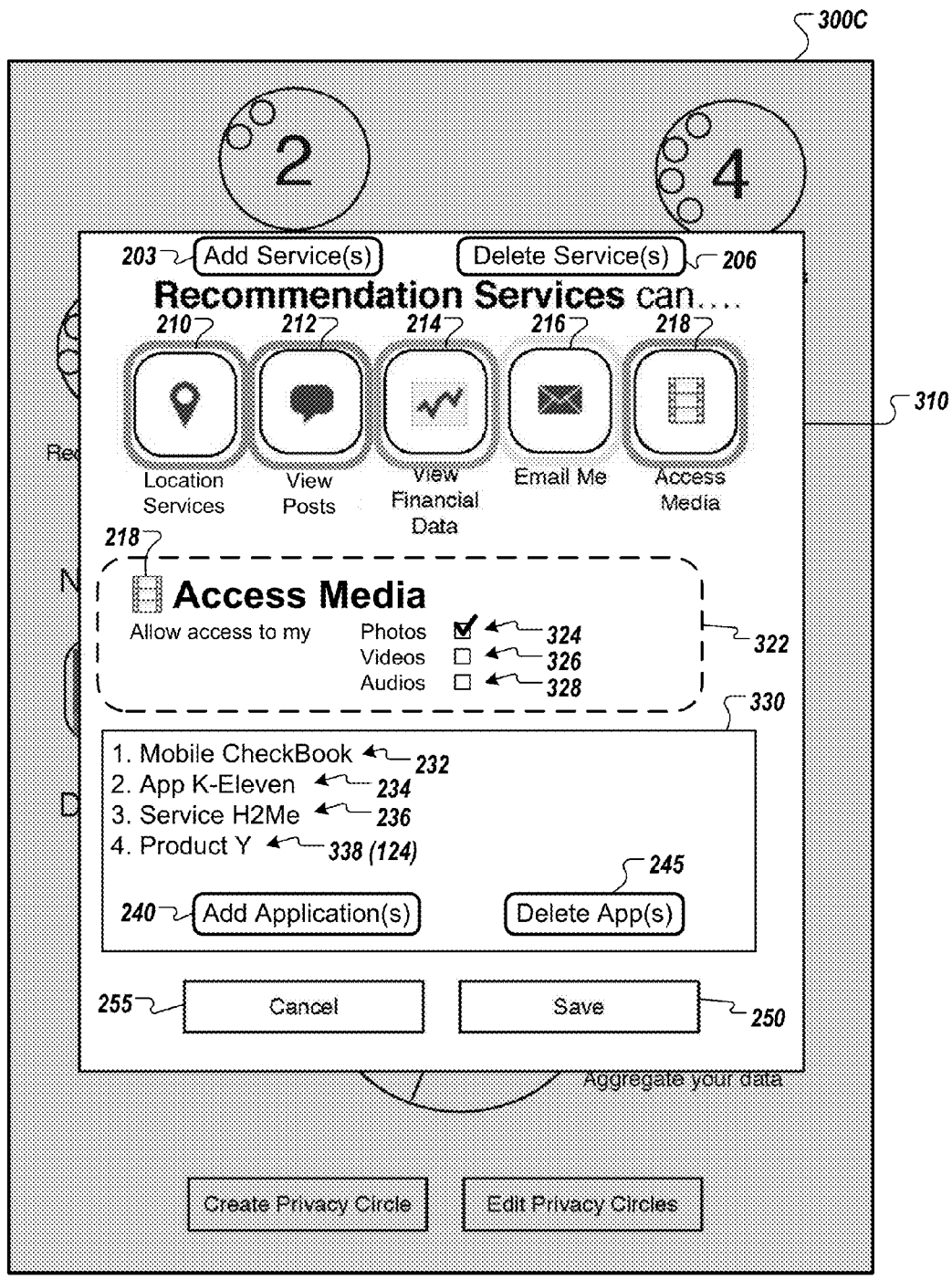

FIG. 3C illustrates that a user may decide to edit the "Access Media" data streams 218 in privacy circle 310 after "Product Y" 214 is associated with the privacy circle. UI 300C shows, in area 322, that "Access Media" 218 is selected. "Access Media" 218 may include photo data 324, video data 326, and audio data 328. The user may select any combination of the media data 324-328 to define the category of "Access Media" 218. For illustration, the user selects photo data 324 and not video data 326 and audio data 328. After pressing the "Save" button 250, "Access Media" 218 includes only photo data 324. Associated third-party applications (e.g., shown in area 330, which include "Product Y" 338 added into the association in FIG. 3B) are given access to photo data 324 and not video data 326 and audio data 328.

Figure 4:
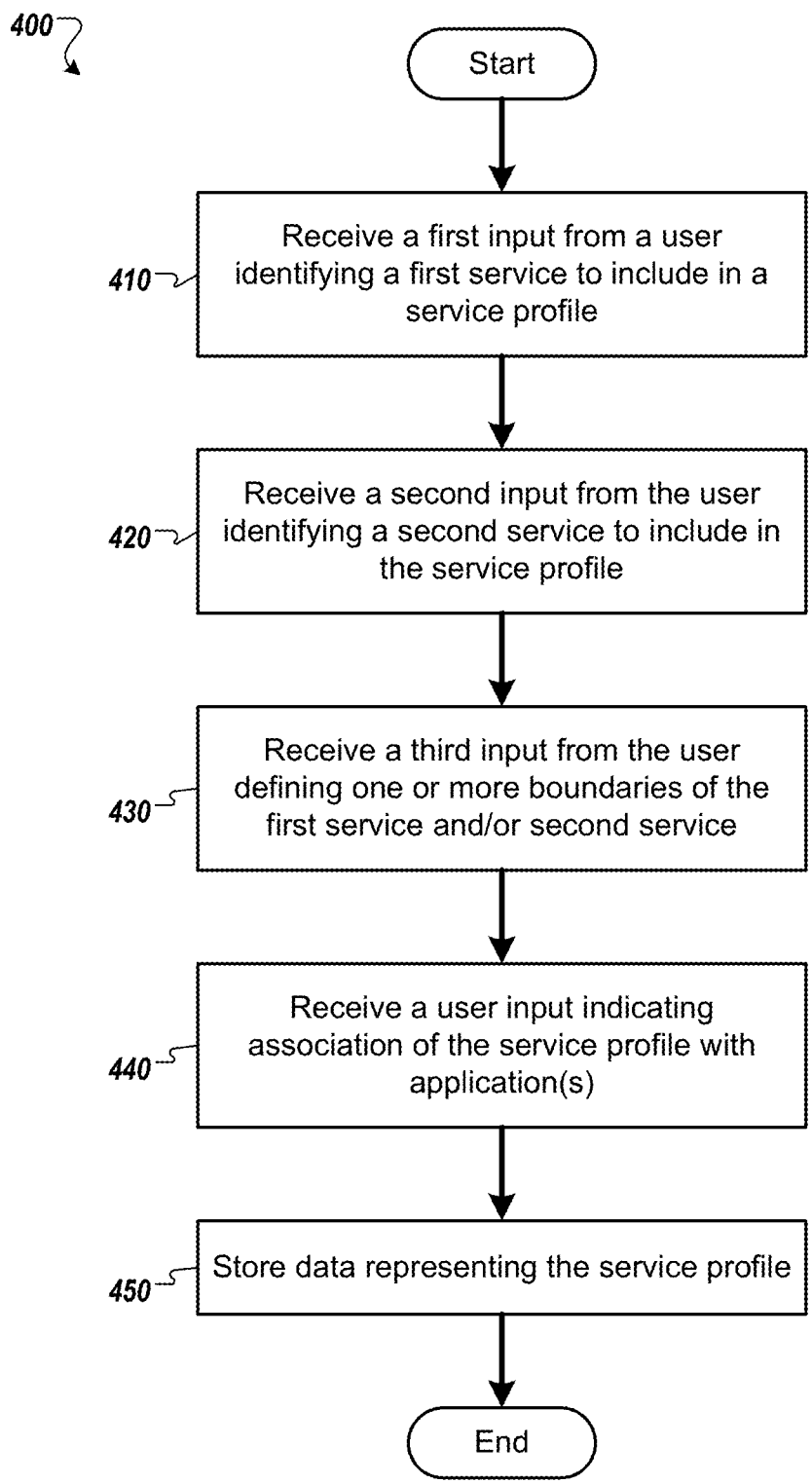
FIG. 4 shows an example of a process implementation.

FIG. 4 shows an example of a process implementation. Process 400 may start with block 410 where a user's input is received for identifying a service to include in a service profile. At block 420, the user's input is received for identifying another service to include in a service profile. The services are associated with the user (e.g., provide access to data and/or services associated with the user). At block 430, the user may provide input to define one or more boundaries of one or more of services. The service profile is to be associated with at least one application (e.g., third-party application) to allow the application access to the one or more services.

At block 440, input from the user associating the service profile with an application is received. At block 450, after any change to the service profile, such as adding, deleting, or modifying a service, a category of service, or an association with an application, the service profile may be stored. Storing the service profile stores the service(s) included in the service profile, stores the boundaries of the service(s), and stores the association of application(s) with the profile. The stored service profile can be edited, deleted, and/or used in providing data and services access to third-party applications or services.

In some examples, process 400 may be implemented with different, fewer, or more blocks. Process 400 may be implemented as computer executable instructions, which can be stored on a medium, loaded onto one or more processors of one or more computing devices, and executed as a computer-implemented method.

Figure 5:
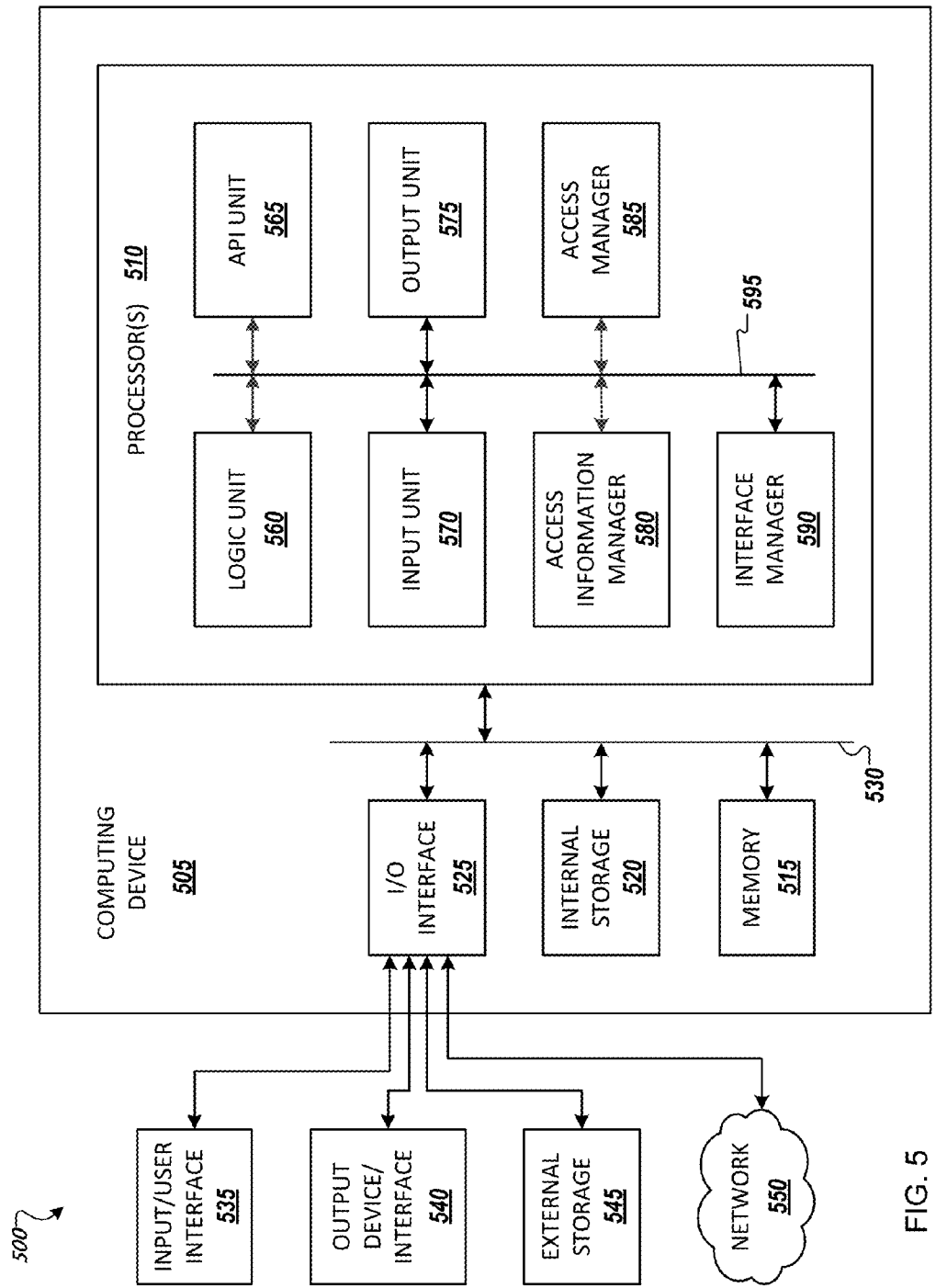
FIG. 5 shows an example computing environment with an example computing device suitable for implementing at least one example implementation.

FIG. 5 shows an example computing environment with an example computing device suitable for implementing at least one example. Computing device 505 in computing environment 500 can include one or more processing units, cores, or processors 510, memory 515 (e.g., RAM, ROM, and/or the like), internal storage 520 (e.g., magnetic, optical, solid state storage, and/or organic), and/or I/O interface 525, any of which can be coupled on a communication mechanism or bus 530 for communicating information, or embedded in the computing device 505.

Computing device 505 can be communicatively coupled to input/user interface 535 and output device/interface 540. Either one or both of input/user interface 535 and output device/interface 540 can be a wired or wireless interface and can be detachable. Input/user interface 535 may include any device, component, sensor, or interface, physical or virtual, which can be used to provide input (e.g., buttons, touch-screen interface, keyboard, a pointing/cursor control, microphone, camera, braille, motion sensor, optical reader, and/or the like). Output device/interface 540 may include a display, television, monitor, printer, speaker, braille, or the like. In some examples, input/user interface 535 and output device/interface 540 can be embedded with or physically coupled to the computing device 505. In other examples, other computing devices may function as or provide the functions of input/user interface 535 and output device/interface 540 for a computing device 505.

Examples of computing device 505 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 505 can be communicatively coupled (e.g., via I/O interface 525) to external storage 545 and network 550 for communicating with any number of networked components, devices, and systems, including one or more computing devices of the same or different configuration. Computing device 505 or any connected computing device can be functioning as, providing services of, or referred to as a server, client, thin server, general machine, special-purpose machine, or another label.

I/O interface 525 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and networks in computing environment 500. Network 550 can be any network or combination of networks (e.g., the Internet, local area network, wide area network, a telephonic network, a cellular network, satellite network, and the like).

Computing device 505 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 505 can be used to implement techniques, methods, applications, processes, or computer-executable instructions for at least one implementation. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 510 can execute under any operating system (OS) (not shown), in a native or virtual environment. One or more applications can be deployed that include logic unit 560, application programming interface (API) unit 565, input unit 570, output unit 575, access information manager 580, access manager 585, interface manager 590, and inter-unit communication mechanism 595 for the different units to communicate with each other, with the OS, and with other applications (not shown). For example, access information manager 580, access manager 585, and interface manager 590 may implement one or more systems and processes shown in FIG. 4. The described units and elements can be varied in design, function, configuration, or implementation and are not limited to the descriptions provided.

In some example implementations, when information or an execution instruction is received by API unit 565, it may be communicated to one or more other units (e.g., logic unit 560, input unit 570, output unit 575, access information manager 580, access manager 585, and interface manager 590). For example, user input may be received by interface manager 590, which communicates the input to access information manager 580 to create or manage a service profile. Access information manager 580 then stores the service profile to be used by access manager 585 to enforce access to user data and/or services.

In some examples, logic unit 560 may be configured to control the information flow among the units and direct the services provided by API unit 565, input unit 570, output unit 575, access information manager 580, access manager 585, and interface manager 590. For example, the flow of one or more processes or implementations may be controlled by logic unit 560 alone or in conjunction with API unit 565.

Although a few example implementations have been shown and described, these example implementations are provided to convey the subject matter described herein to people who are familiar with this field. It should be understood that the subject matter described herein may be embodied in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method executed using one or more computing devices, the method comprising:
   transmitting, using the one or more computing devices, instructions to display a user interface (UI), the UI comprising:
      a service profile zone having a service profile icon as a graphical representation of a service profile that associates a data service with an application, the service profile icon including an indicator of the application having access to data associated with the user, based on the service profile; and
      an application zone having an application icon that graphically represents another application not having access to the data associated with the user, based on the service profile;
   receiving, at the one or more computing devices, a first user input indicative of repositioning the application icon from the application zone to the service profile icon, or the indicator from the service profile icon to the application zone;
   displaying another indicator, as a graphical representation of whether the another application is provided access to the data associated with the user, in response to the first user input;
   determining a privacy setting associated with the service profile based on a position of the indicator and the another indicator; and
   controlling, using the one or more computing devices, access by the application and the another application to the data associated with the user based on the privacy setting associated with the service profile.

2. The method of claim 1, wherein the first user input comprises repositioning the application icon from the application zone to the service profile icon, and the another indicator is displayed at the service profile icon as a graphical representation of the privacy setting providing the another application access to the data associated with the user.

3. The method of claim 1, wherein the first user input comprises repositioning of the indicator from the service profile icon to the application zone, and the another indicator is displayed at the application zone as a graphical representation of the privacy setting not providing the another application access to the data associated with the user.

4. The method of claim 1, wherein the first user input comprises dragging the application icon between the application zone and the service profile icon.

5. The method of claim 1, wherein the service profile icon further comprises a visual representation of a number of applications, including the application, associated with the service profile.

6. The method of claim 1, the UI further comprising a service profile management icon as a graphical representation of an option to create or edit the service profile.

7. The method of claim 1, wherein the service profile includes one or more user-defined categories of data that are associated with the application.

8. A computer-implemented method executed using one or more computing devices, the method comprising:
   transmitting, using the one or more computing devices, instructions to display a user interface (UI), the UI comprising:
      a data service management region having a plurality of data service icons that graphically represent corresponding data service categories associated with a service profile;
      a data service category management region having one or more access settings for a selected one of the data service categories; and
      an application management region having a list of applications, and a selectable object that graphically represents an option to add or delete one or more of the applications with respect to the service profile;
   receiving, at the one or more computing devices, a first user input in the data service management region indicative of associating one of the data service categories with the service profile;
   for the one or more data service icons associated with the service profile based on the first user input, receiving, at the one or more computing devices, a second user input in the data service category management region indicative of determining the one or more access settings for the one of the data service categories;
   receiving, at the one or more computing devices, a third user input in the application management region indicative of associating an application with the data service categories of the service profile;
   determining a privacy setting associated with the service profile based on the first input, the second input, and the third input; and
   controlling, using the one or more computing devices, access by the application to the data associated with the user based on the determined privacy setting.

9. The method of claim 8, wherein the first user input comprises clicking on one or more of the data service icons to select or deselect the one or more data service categories.

10. The method of claim 8, wherein the second user input comprises inputting a frequency setting or a data type setting as the one or more access settings for the one of the data service categories.

11. The method of claim 8, wherein the third user input comprises selecting the application, and selecting a button to add or delete the selected application with respect to the service profile.

12. A non-transitory computer-readable medium having executable instructions stored on a storage and implemented by a processor, the instructions comprising:
   transmitting, using the one or more computing devices, instructions to display a user interface (UI), the UI comprising:
      a service profile zone having a service profile icon as a graphical representation of a service profile that associates a data service with an application, the service profile icon including an indicator of the application having access to data associated with the user, based on the service profile; and
      an application zone having an application icon that graphically represents another application not having access to the data associated with the user, based on the service profile;
   receiving, at the one or more computing devices, a first user input indicative of repositioning the application icon from the application zone to the service profile icon, or the indicator from the service profile icon to the application zone;

displaying another indicator, as a graphical representation of whether the another application is provided access to the data associated with the user, in response to the first user input;

determining a privacy setting associated with the service profile based on a position of the indicator and the another indicator; and controlling, using the one or more computing devices, access by the application and the another application to the data associated with the user based on the privacy setting associated with the service profile.

13. The non-transitory computer-readable medium of claim 12, wherein the first user input comprises repositioning the application icon from the application zone to the service profile icon, and the another indicator is displayed at the service profile icon as a graphical representation of the privacy setting providing the another application access to the data associated with the user.

14. The non-transitory computer-readable medium of claim 12, wherein the first user input comprises repositioning of the indicator from the service profile icon to the application zone, and the another indicator is displayed at the application zone as a graphical representation of the privacy setting not providing the another application access to the data associated with the user.

15. The non-transitory computer-readable medium of claim 12, wherein the first user input comprises dragging the application icon between the application zone and the service profile icon.

16. The non-transitory computer-readable medium of claim 12, wherein the service profile icon further comprises a visual representation of a number of applications, including the application, associated with the service profile.

17. The non-transitory computer-readable medium of claim 12, the UI further comprising a service profile management icon as a graphical representation of an option to create or edit the service profile.

18. The non-transitory computer-readable medium of claim 12, wherein the service profile includes one or more user-defined categories of data that are associated with the application.

* * * * *